(12) United States Patent
Courtemanche

(10) Patent No.: US 6,505,895 B2
(45) Date of Patent: Jan. 14, 2003

(54) CLIP FOR SNOWMOBILE TRACK

(75) Inventor: Denis Courtemanche, Richmond (CA)

(73) Assignee: Camoplast Inc. (CA)

( * ) Notice: Subject to any disclaimer, the term of this patent is extended or adjusted under 35 U.S.C. 154(b) by 67 days.

(21) Appl. No.: 09/839,789

(22) Filed: Apr. 20, 2001

(65) Prior Publication Data

US 2002/0153774 A1 Oct. 24, 2002

(51) Int. Cl.⁷ .................. B62D 55/24; B65G 15/44; B64C 25/00; F16G 1/00
(52) U.S. Cl. .................. 305/168; 305/165; 305/180
(58) Field of Search .................. 305/168, 180, 305/181, 165, 167, 127

(56) References Cited

U.S. PATENT DOCUMENTS

| | | | | |
|---|---|---|---|---|
| 2,343,533 A | * | 3/1944 | Burnham | 305/127 |
| 3,887,243 A | * | 6/1975 | Chaumont | 305/168 |
| 4,023,865 A | * | 5/1977 | Morissette | 305/168 |
| 4,217,006 A | * | 8/1980 | Dehnert | 305/168 |
| 4,474,414 A | * | 10/1984 | Tokue | 305/168 |
| 4,991,911 A | * | 2/1991 | Blais | 305/168 |
| 5,267,796 A | * | 12/1993 | Nonaka et al. | 305/166 |
| 5,415,470 A | * | 5/1995 | Courtemanche | 305/168 |
| 5,722,745 A | * | 3/1998 | Courtemanche et al. | 305/168 |
| 6,422,665 B1 | * | 7/2002 | Courtemanche | 305/167 |
| 6,431,666 B2 | * | 8/2002 | Courtemanche | 305/168 |

* cited by examiner

Primary Examiner—S. Joseph Morano
Assistant Examiner—Jason R. Bellinger
(74) Attorney, Agent, or Firm—Schnader Harrison Segal & Lewis LLP

(57) ABSTRACT

A clip for use on a track of a snowmobile of the type having a suspension system equipped with one or more elongated slide runners, the track consisting of an endless body having an outer face with transverse ground engaging profiles spaced longitudinally thereof and inner surface adapted to receive, on portions of the lower run thereof, a slide runner of the suspension system. The clip has an inner wall and a pair of side walls engaging the body of the track. The inner wall includes a flat face receiving a slide runner thereon during use of the snowmobile. The flat face displays a series of holes whereby snow or ice over which the snowmobile travels, when lodged in these holes during use, provides lubrication for the sliding contact of the slide runner on a clip and cooling of the clip body from heat generated by the frictional contact of the slide runner on the clip. Furthermore, the presence of these holes reduces the weight of the track so that this mass reduction allows higher rotational speed and less damage to reinforcing rods embedded in the track.

8 Claims, 2 Drawing Sheets

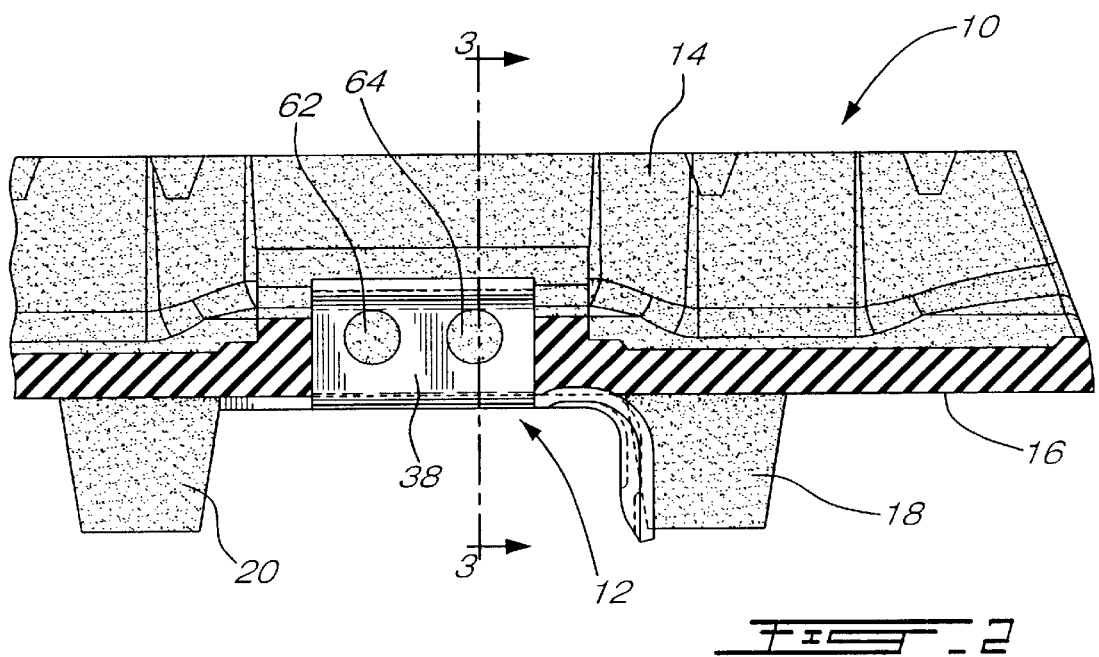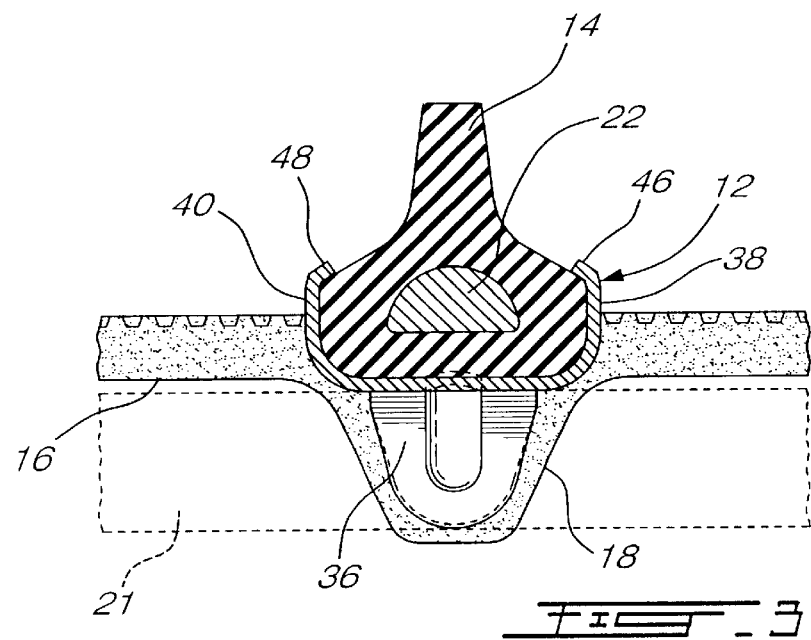

CLIP FOR SNOWMOBILE TRACK

FIELD OF THE INVENTION

The present invention relates to a clip for mounting to the track of a snowmobile that has a suspension system equipped with one or more elongated slide runners.

BACKGROUND OF THE INVENTION

Some snowmobiles are equipped with one or more slide runners as part of their suspension system. These slide runners bear on the inner surface of the lower run of the snowmobile track to provide the latter with traction and, more particularly, rest on metal clips so as to provide sliding contact with the track. Great heat is generated by this frictional contact between the slide runners and the clips and this greatly affects the elastomeric material of the track.

Also, the presence of clips on a snowmobile track adds to its weight and the resulting mass has an effect on the rotational speed of the track when driven.

Also, clips are secured to the track in areas where rods are embedded transversally to reinforce the track; these areas are subject to damage.

OBJECTS AND STATEMENT OF THE INVENTION

The present invention is concerned with providing a metal clip which will have various effects, namely to provide lubrication for the sliding contact of the slide runner on the clip, generate a cooling effect to reduce the heat generated by such sliding contact and reduce the weight of the overall track.

These effects are achieved by providing the clip with a series of holes thereby reducing its weight while providing pockets in which snow or ice may be lodged so as to cool the clip.

The present invention therefore relates to a clip which comprises a body having an inner wall and a pair of side walls for engaging said body of said track; said inner wall including a flat face for receiving a slide runner thereon during use of said snowmobile; said flat face displaying a series of holes whereby snow or ice over which said snowmobile travels, when lodged in said holes during said use, provides lubrication for the sliding contact of the slide runner on said clip and cooling of said clip from heat generated by frictional contact of said slide runner on said clip; said holes providing weight reduction of the track thereby allowing increased rotational speed of the track.

In one form of the invention, additional holes are provided on other faces of the clip which are not in contact with the slide runners but which will still provide cooling of the clip and weight reduction.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is a cross-sectional view taken transversally at the side edge portion of a snowmobile track; and FIG. 3 is a cross-sectional view taken along lines 3—3 of FIG. 2.

DESCRIPTION OF PREFERRED EMBODIMENTS

Figure 1:
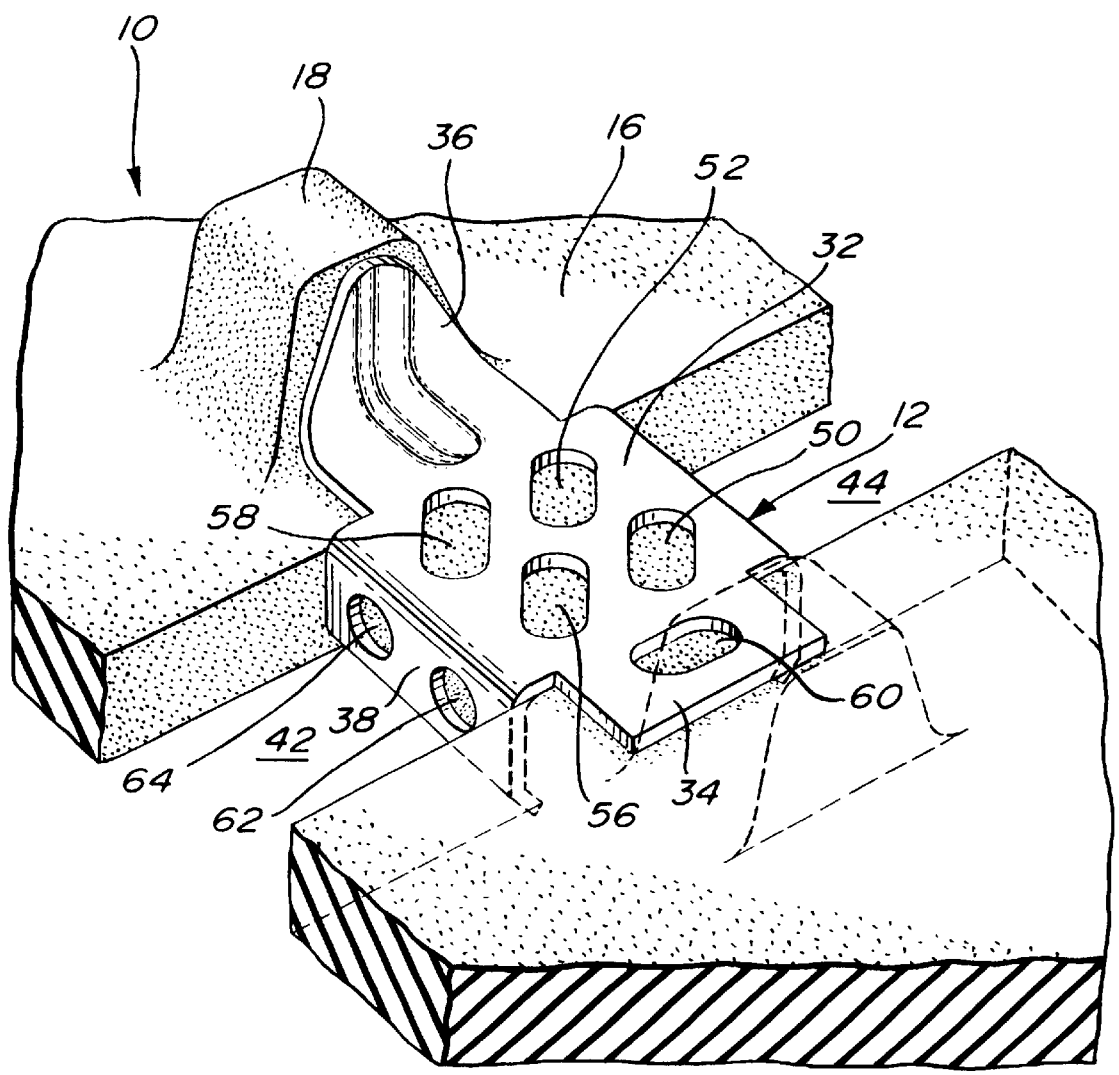
FIG. 1 is a perspective view showing a metal clip made in accordance with the present invention shown mounted on part of a snowmobile track.

Referring to FIGS. 1—3, part of a snowmobile track, generally denoted 10, is shown equipped with a metal clip 12 made in accordance with the present invention. The track is formed of a body of elastomeric material, the outer surface of which displays a series of transverse profiles 14 that provide traction for the snowmobile as it travels over ground, especially snow or ice. The inner surface 16 of the track displays a series of integral lugs (two being shown as 18 and 20) which are contacted by sprocket wheels (not shown) that drive the snowmobile track in rotation.

Many snowmobiles have a suspension system consisting of one or more slide runners (shown in dotted lines as 21) which bear against the inner surface of the lower run of the track to maintain the track in maximum contact with the ground over which it travels. A detailed description of such a suspension system is not deemed necessary as it is well known in the art and described in many patents. It is suffice to say that these slide runners bear on metal clips which are fixedly secured to the track. These clips are present in those areas of the track where a transverse rod 22 (see FIG. 3) is embedded to reinforce the track.

It is well known that the sliding contact of slide runners on these metal clips generate extreme heat. It is also known that tracks are often damaged in the reinforcing rod areas.

The present invention therefore pertains to an improved metal clip which is intended to reduce this heat and to improve the sliding contact of runner on clip while causing a weight reduction which will improve the rotational speed of the track and reduce damage in the reinforcing rod areas.

The metallic clip 12 comprises a body of metallic material having an inner wall 32 and a pair of opposite side extensions 34 and 36, the latter being shaped to bear against the side wall of the track lug 18. The clip body also includes a pair of opposite side walls 38 and 40 which extend in openings 42 and 44 defined longitudinally of the track. To secure the clip to the track, each side wall 38 and 40 has its respective end 46, 48 bent to ensure adequate engagement of the metal clip to the body of the track.

The wall 32 of the clip is provided with a series of openings, four being shown as 50, 52, 56 and 58 which may have various shapes. Whenever the snowmobile travels over snow or ice, these holes are filled with snow or ice thus providing lubrication for the sliding contact of the slide runner on the clip. Additionally, the snow or ice provide a cooling effect to the clip which is heated as a result of the sliding contact of the slide runner on the clip.

Additional cooling may be obtained by providing for example hole 60 on the wall extension 34 and/or holes 62 and 64 on the side wall 38. Although not shown in the drawings, similar holes may be provided on side wall 40.

It has also been found that these holes in the clips can result in a reduction of 1½ lbs on a 121 inch long track where 96 clips are provided in two rows of openings extending longitudinally of the track. It has been noted that this weight reduction reduces the mass of the track which is usually driven at high speeds. Mass reduction enables higher speed.

Although the invention has been described above with respect to one specific form, it will be evident to a person skilled in the art that it may be modified and refined in various ways. For example, the invention also relates to clip which are made of plastics material. It is therefore wished to have it understood that the present invention should not be limited in scope, except by the terms of the following claims.

What is claimed is:

1. A clip for use on a track of a snowmobile of the type having a suspension system equipped with one or more elongated slide runners, said track consisting of an endless body having an outer face with transverse ground engaging profiles spaced longitudinally thereof and an inner surface adapted to receive, on portions of the lower run thereof, said slide runners of said suspension system; said clip comprising a body having an inner wall and a pair of side walls for engaging said body of said track; said inner wall including a flat face for receiving a slide runner thereon during use of said snowmobile; said flat face displaying a series of holes whereby snow or ice over which said snowmobile travels, when lodged in said holes during said use, provides lubrication for the sliding contact of the slide runner on said clip and cooling of said clip from heat generated by frictional contact of said slide runner on said clip; said holes providing weight reduction of the track thereby allowing increased rotational speed of the track.

2. A clip as defined in claim 1, wherein said side walls of said body includes holes to receive snow or ice to further cool said clip and to further reduce weight of the track.

3. A clip as defined in claim 1, wherein said inner wall of said body includes a pair of opposite side extensions; one of said side opposite extensions being curved to contact a driving lug on the inner surface of said track, the other of said extensions extending outside the slide contacting area of said slide and said clip displaying a hole to further cool said clip and to further reduce weight of said track.

4. A clip as defined in claim 1, wherein said body is metallic.

5. A track for use on a snowmobile of the type having a suspension system equipped with one or more elongated slide runners, said track comprising: an endless body having an outer face with transverse ground engaging profiles spaced longitudinally thereof and an inner surface adapted to receive, on portions of the lower run thereof, said slide runners of said suspension system; said track including, in said portions, a row of longitudinally spaced metal clips secured to said body of said track; each said clip having an inner wall and a pair of side walls engaging said body of said track; said inner wall including a flat face receiving a slide runner thereon during use of said snowmobile; said flat face displaying a series of holes whereby snow or ice over which said snowmobile travels, when lodged in said holes during said use, provides lubrication for the sliding contact of the slide runner on said clip and cooling of said clip from heat generated by frictional contact of said slide runner on said clip; said holes providing weight reduction thereby allowing increased rotational speed of the track.

6. A track as defined in claim 5, wherein said side walls of said clip includes holes to receive snow or ice to further cool said clip and to further reduce weight of the track.

7. A track as defined in claim 5, wherein said inner wall of said clip includes a pair of opposite side extensions; one of said side opposite extensions being curved to contact a driving lug on the inner surface of said track, the other of said extensions extending outside the slide contacting area of said slide and said clip displaying a hole to further cool said clip and to further reduce weight of said track.

8. A track as defined in claim 5, wherein said clip is metallic.

* * * * *